July 15, 1924.
O. W. MOORE
TEMPERATURE INDICATOR
Filed March 10, 1922
1,501,173
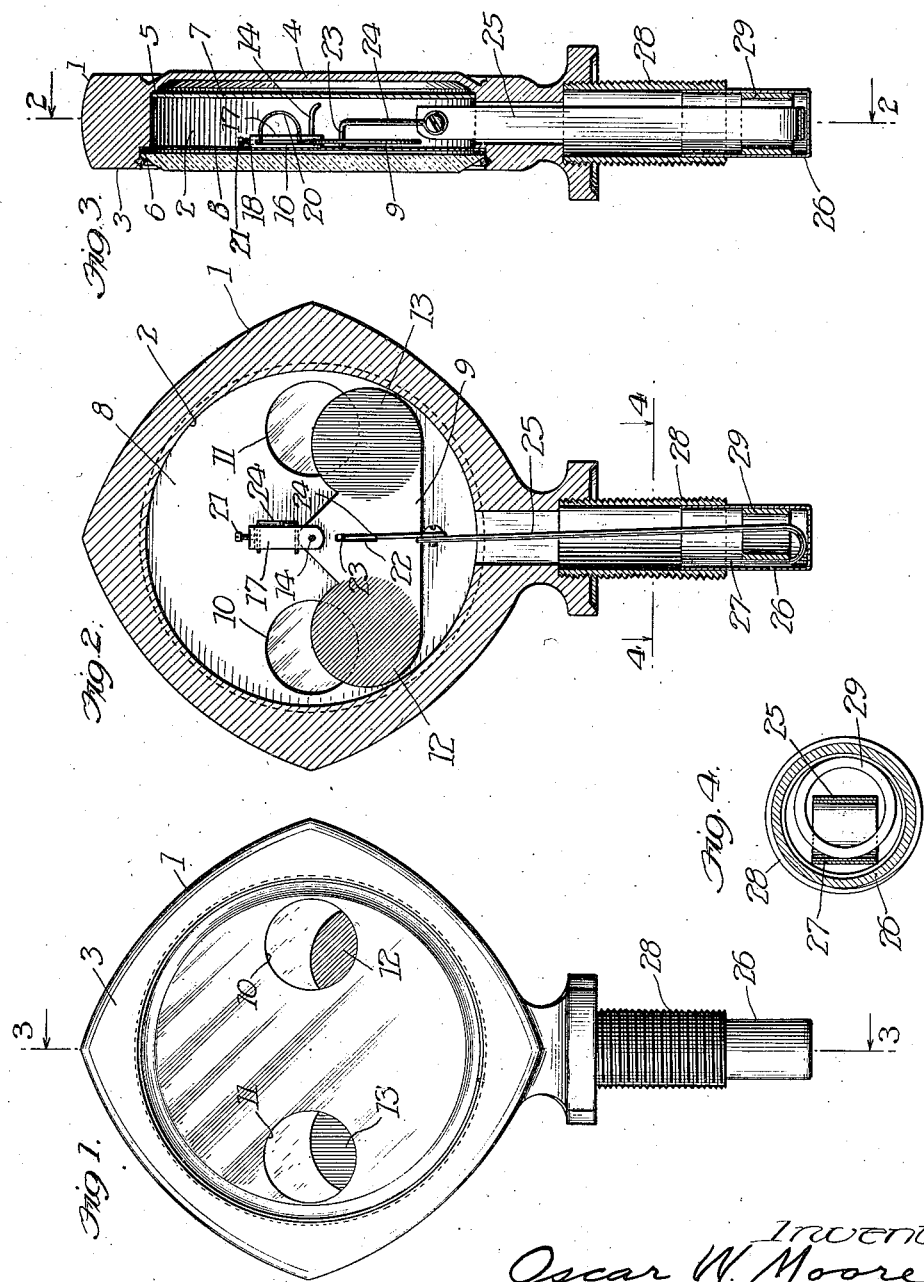

Patented July 15, 1924.

1,501,173

UNITED STATES PATENT OFFICE.

OSCAR W. MOORE, OF CHICAGO, ILLINOIS.

TEMPERATURE INDICATOR.

Application filed March 10, 1922. Serial No. 542,599.

*To all whom it may concern:*

Be it known that I, Oscar W. Moore, a citizen of the United States of America, and a resident of Chicago, county of Cook, and State of Illinois, have invented a new and useful Improvement in Temperature Indicators, of which the following is a specification.

This invention relates to thermometers for use in indicating the temperature of the cooling water of an internal combustion engine and thereby indirectly indicating the temperature of the engine. The objects of the invention are to provide an improved operating mechanism for this class of devices whereby there is less likelihood of breakage occurring due to rough handling of the instrument or vibrations of the engine; to provide a thermostatically operated indicating mechanism which is not sensitive to the slight vibrations of the instrument as a whole; and to provide a general arrangement of such devices which is easily assembled and has but few and reliable parts in its operating mechanism.

The objects of the invention are accomplished by the device shown in the accompanying drawing, in which—

Figure 1 shows in front elevation a temperature indicator constructed according to this invention.

Fig. 2 is a transverse sectional elevation taken on the line 2—2 of Figure 3.

Fig. 3 is a longitudinal vertical section taken on the line 3—3 of Figure 1.

Fig. 4 is a horizontal sectional detail taken on the line 4—4 of Figure 2.

The device comprises generally a cast casing having a depending nipple which may be screwed into the filler cap of an automobile radiator. The casing, as usual, is of some ornamental design, but in the present case has a solid back forwardly of which in a recess in the casing are placed the signalling arm of the indicator and its support. This support includes a disk resting against an annular shoulder formed in the hollowed out part of the casing and having a pair of sight apertures, one to the right and one to the left of the axis of this disk. The signalling arm oscillates upon a central pivot and indicates at one or the other, or both of these sight apertures the approximate temperature within the engine. For example, this arm may be colored green on one side and red on the other side. When the green is mainly in view this would indicate that the engine is cool, whereas when the red is mainly in view the indication is that the engine is warm or at too high a temperature. The device is calibrated so that under normal running conditions of the engine red and green will be equally displayed at the sight apertures. The signalling arm is operated by the expansion or contraction of a thermostatic element which is mounted in a depending enclosed portion of the casing, and extends upwardly into position to engage the signalling arm.

Referring to the drawings, the main body of the casing 1 is shown provided with a central annular recess 2 which extends from the front surface 3 of the casing to the solid back 4 thereof. Annular shoulders 5 and 6 are respectively formed on the inner surface of the casing and for receiving disks 7 and 8. The disk 7 has its front surface brightly painted or enameled white or some luminous color forming a good contrast with the green and red colors on the indicating arm 9. When neither of the sight apertures 10 and 11 in the disk 8 are wholly closed by either the green portion 12 or the red portion 13 of arm 9, the enamel on the surface of disk 7 shows through these sight openings. The signalling arm 9 is supported by a centrally located pin 14. This pin passes through apertures in the arms 16 and 17 of a bracket 18, secured to the inner face of disk 8. The indicating arm 9 is supported between the arms 16 and 17 of the bracket and its upper edge bears against one of the bent arms of a spring clip 20. This spring serves to steady the motion of arm 9 and afford a desired resistance to its movement. This resistance may be regulated by means of a small set screw 21 by means of which the tension of the spring may be varied. The arm 9 has a vertical slot 22 through which extends the bent end 23 of a wire 24 extending upwardly from the end of thermostatic lamina 25. This lamina extends downwardly into a supporting cup 26 therefor. At its lower end the lamina 25 is bent into U-shape, the part 27 thereof being soldered to the inner surface of cup 26 and this cup in turn is soldered into the lower end of the surrounding nipple 28. In order to more firmly hold the thermostatic lamina in place and to prevent its movement during the soldering operation, it is clamped inside of the cup or thimble 26 by a ferrule 29.

In the operation of the device, the elongated arm of the thermostatic element swings to right or left, Figure 2, due to the effect of temperature on the lower U-shaped end of this element, which is in the thimble 26 immersed in the cooling fluid of the engine radiator. When the U expands the red portion of the indicating arm travels more into view at the sight opening 11 while less of the green portion of the arm is shown at the sight opening 10. If the cooling medium is highly heated then the red only will show, and likewise when the cooling medium approaches to near the freezing point, green only will show at the indicator, that is, green at the sight opening 10 and white at the sight opening 11.

Although but one specific embodiment of this invention has been herein shown and described it will be understood that numerous details of the construction shown may be altered or omitted without departing from the spirit of this invention as defined by the following claim.

I claim:

A device of the class described comprising a casing, indicating mechanism mounted therein, a tubular extension depending from said casing, a U-shaped thermostatic lamina in said extension and having one arm extending upwardly into cooperative relation with said indicating mechanism, a ferrule in said tubular extension and through which passes said arm of the thermostatic lamina, said ferrule serving to hold the remaining arm of the thermostatic lamina against the wall of said tubular extension.

Signed at Chicago this 23 day of Feb. 1922.

OSCAR W. MOORE.